(12) United States Patent
Shu et al.

(10) Patent No.: US 12,631,505 B2
(45) Date of Patent: May 19, 2026

(54) FLEXIBLE STRAIN SENSOR BASED ON SAME CONDUCTIVE MATERIAL, AND METHOD FOR PREPARING SAME

(71) Applicants: SOUTH CHINA UNIVERSITY OF TECHNOLOGY, Guangzhou (CN); Zhongshan Institute of Modern Industrial Technology of SCUT, Zhongshan (CN)

(72) Inventors: Lin Shu, Guangzhou (CN); Xiaobin Chen, Guangzhou (CN); Xiangmin Xu, Zhongshan (CN)

(73) Assignees: SOUTH CHINA UNIVERSITY OF TECHNOLOGY, Guangzhou (CN); ZHONGSHAN INSTITUTE OF MODERN INDUSTRIAL TECHNOLOGY OF SCUT, Zhongshan (CN)

( * ) Notice: Subject to any disclaimer, the term of this patent is extended or adjusted under 35 U.S.C. 154(b) by 277 days.

(21) Appl. No.: 18/551,723

(22) PCT Filed: Oct. 18, 2021

(86) PCT No.: PCT/CN2021/124326
  § 371 (c)(1),
  (2) Date: Sep. 21, 2023

(87) PCT Pub. No.: WO2022/198988
  PCT Pub. Date: Sep. 29, 2022

(65) Prior Publication Data
  US 2024/0167898 A1     May 23, 2024

(30) Foreign Application Priority Data
  Mar. 22, 2021   (CN) ......................... 202110300119.0

(51) Int. Cl.
  G01L 1/22       (2006.01)

(52) U.S. Cl.
  CPC .................................. *G01L 1/2287* (2013.01)

(58) Field of Classification Search
  None
  See application file for complete search history.

(56) References Cited

U.S. PATENT DOCUMENTS 5,440,193 A * 8/1995 Barrett ................. H10N 30/204
                                                    310/330
6,152,597 A * 11/2000 Potega .............. H01M 10/4257
                                                    327/512
(Continued)

FOREIGN PATENT DOCUMENTS

CN        1985761 A      6/2007
CN      104833707 A      8/2015
(Continued)

OTHER PUBLICATIONS

International Search Report and Written Opinion in corresponding International Ser. No. PCT/CN2021/124326 dated Dec. 10, 2021.
(Continued)

*Primary Examiner* — Eric S. McCall
*Assistant Examiner* — Nigel H Plumb
(74) *Attorney, Agent, or Firm* — Steven M. Koehler; Westman, Champlin & Koehler, P.A.

(57) ABSTRACT

A flexible strain sensor comprises a sensing area, a connection area, an encapsulation layer and a flexible substrate. The sensing area and the connection area are made of the same conductive material by adjusting size structures of different areas. The sensor is prepared by performing one-step printing of carbon black-silicone rubber composite conductive paste on a fabric substrate on the basis of a screen printing process. The method is simple and convenient to operate, is low in manufacturing cost and is suitable for large-scale production; and the prepared sensor has a high sensitivity (≈10), a large strain range (~100%), a low hysteresis quality
(Continued)

and a good stability, and can be applied to the fields of human body motion detection, intelligent medical service, etc. The method for preparing a sensor in the present invention has important reference value for industrial production of a flexible strain sensor.

8 Claims, 2 Drawing Sheets

(56) References Cited

U.S. PATENT DOCUMENTS

| | | | | |
|---|---|---|---|---|
| 2019/0189358 | A1* | 6/2019 | Yuge | H01C 17/065 |
| 2020/0141825 | A1* | 5/2020 | Obata | G01B 7/16 |

FOREIGN PATENT DOCUMENTS

| | | |
|---|---|---|
| CN | 105066863 A | 11/2015 |
| CN | 106153207 A | 11/2016 |
| CN | 106168524 A | 11/2016 |
| CN | 108267076 A | 7/2018 |
| CN | 108562219 A | 9/2018 |
| CN | 108753169 A | 11/2018 |
| CN | 109115107 A | 1/2019 |
| CN | 109883315 A | 6/2019 |
| CN | 110431516 A | 11/2019 |
| CN | 111566435 A | 8/2020 |
| CN | 111758012 A | 10/2020 |
| CN | 113063342 A | 7/2021 |
| EP | 0534226 A1 | 3/1993 |
| JP | 2016170123 A | 9/2016 |
| WO | 2019244990 A1 | 12/2019 |

OTHER PUBLICATIONS

Shu et al. "The Investigation of Integrated SAW Strain Sensor Based on AIN/TC4 Structure", Sensors and Actuators A: Physical, 2019, pp. 14-20, vol. 293.

Zhidong et al. "Resistance Response of Conductive Rubber-based Resistance Sensors to Tensile Strain Loads", Journal of Beijing University of Technology, Nov. 2020, pp. 1291-1299, vol. 46, No. 11.

* cited by examiner

FLEXIBLE STRAIN SENSOR BASED ON SAME CONDUCTIVE MATERIAL, AND METHOD FOR PREPARING SAME

CROSS-REFERENCE TO RELATED APPLICATION

This Application is a Section 371 National Stage Application of International Application No. PCT/CN2021/124326, filed Oct. 18, 2021 and published as WO 2022/198988 A1 on Sep. 29, 2022, in English, and further claims priority to Chinese patent application Ser. No. 202110300119.0, filed Mar. 22, 2021, the contents of which are hereby incorporated by reference in their entirety.

FIELD OF THE INVENTION

The present disclosure falls within the technical field of sensors, and particularly relates to a flexible strain sensor based on the same conductive material and a preparation method thereof.

BACKGROUND OF THE INVENTION

A strain sensor is a device that converts an external mechanical signal into an electrical signal, and the device is deformed under the action of an external force, thereby causing the change of the electrical properties of the internal sensing material to achieve sensing. Traditional strain sensors are mostly made of metal and semiconductor materials, which are difficult to apply to complex interfaces due to their narrow tensile strain range and inflexibility. Flexible strain sensors, due to their advantages of ultra-thinness, low modulus, high flexibility, and high ductility, can be attached to complex curved surfaces, and can be used in wider and more complex application conditions than traditional metal sensors. The flexible strain sensors have attracted extensive attention from researchers. Currently, the flexible strain sensors are often integrated into wearable devices and have important applications in medical health, human motion detection, soft robots, and human-computer interaction.

Resistive strain sensors have become the mainstream of the flexible strain sensors because of their simple manufacture, low cost, and strong stability. A classical resistive strain sensor should consist of a sensing area and a connection area in series, and a resistance change ΔR and an initial resistance $R_0$ of the sensor are determined by the sensing area and the connection area. Various materials and shape structures are designed to construct the sensing area and the connection area of the sensor to increase the sensitivity and measurement range of the sensing area and minimize the resistive contribution of the connection area. However, to ensure local sensitivity and durability, the material of the connection area should have high conductivity and stable mechanical properties. The traditional design method uses carbon nanomaterials as the sensing area and metal films as the connection area. The metal films have ultra-high conductivity and stable mechanical properties, but the metal material is generally expensive. In order to use a carbon-based material instead of a metal material as the connection area to reduce costs and to have comparable performance of metal connection, researchers have also used carbon black doped polydimethylsiloxane as the sensing area because of its high resistivity and strong dependence on strain, and carbon nanotube doped polydimethylsiloxane as the connection area because of its relatively low resistivity and weak dependence on strain.

However, the above methods all require multi-step operation, are expensive to manufacture, and different materials require multiple drying and curing, which increases the complexity of the process and is not conducive to mass production of the flexible strain sensors. Therefore, how to facilitate easy and low-cost fabrication of the flexible strain sensors is a technical barrier to mass production of sensors.

SUMMARY OF THE INVENTION

In view of the state of the related art, the present disclosure provides a flexible strain sensor based on the same conductive material and a preparation method thereof, aiming to solve the problems that the manufacturing process of the flexible strain sensor is complicated and mass production is difficult.

In an aspect, the technical solution adopted by a sensor of the present disclosure is as follows. A flexible strain sensor based on the same conductive material, where the flexible strain sensor is of a layered structure and includes a flexible substrate, a sensing area and a connection area located on the flexible substrate, and an encapsulation layer for protecting the sensing area.

The sensing area and the connection area are made of the same conductive material, and sizes and shape structures of the sensing area and the connection area satisfy that when the flexible strain sensor is deformed, a resistance value change of the flexible strain sensor is determined by the sensing area, a resistance value of the connection area is ignored, and the connection area is only used for connecting the sensing area and an external device.

In a preferred embodiment, the sensing area is connected by a plurality of elongated rectangles circuitously, the connection area is a large rectangle, and the strain degree of the sensing area is more than the strain degree of the connection area when the sensor is deformed.

In another aspect, the preparation method of the present disclosure adopts the following technical scheme. A method for preparing the flexible strain sensor based on the same conductive material includes the following steps.

At S1, the same composite conductive material is used to design the sensing area and the connection area, where the design rule is that when the sensor is deformed, the resistance value change of the sensor is determined by the sensing area, the resistance value of the connection area is ignored, and the connection area only serves to connect the sensing area and the external device.

At S2, the sensing area and the connection area of the sensor are prepared by printing in one step with the same composite conductive material, the silicone rubber is coated on the sensing area as the encapsulation layer for protection, and accessories connected to the external device are mounted on the connection area.

In a preferred embodiment, the resistance change of the sensor is characterized in step S1 as:

$$\frac{\Delta R}{R_0} = \frac{GF_s \varepsilon_s R_{s0} + GF_c \varepsilon_c R_{c0}}{R_0},$$

where ΔR is the resistance change value of the sensor, $R_0$ is an initial resistance value of the sensor, $R_{s0}$ represents an initial resistance value of the sensing area, $R_{c0}$ represents an initial resistance value of the connection area, $\varepsilon_s$ is a strain value of the sensing area, $\varepsilon_c$ is a strain value of the connection area, $GF_s$ is the sensitivity of the sensing area, and $GF_c$ is the sensitivity of the connection area.

Parameters of the sensor are designed to meet three conditions: $R_{s0} \gg R_{c0}$, $GF_s \geq GF_c$, and $\varepsilon_s \geq \varepsilon_c$.

Advantageous effects of the present disclosure compared to the prior art are as follows.

1. The sensor of the present disclosure uses the same conductive material for the sensing area and the connection area, provides a simple method of operation for one-step printing to complete the fabrication, eliminates the need for additional preparation of electrodes, greatly saving production time.

2. The sensor of the present disclosure has good stability and repeatability, and the use of the same material in the sensing area and the connection area solves the sensor fatigue problem due to the mechanical mismatch of the different materials. The sensor can work normally after 10,000 cycles of 50% stretching, which provides performance support for long-term use of the sensor.

3. The sensor of the present disclosure uses metal snap buttons as the electrical connection, which are conveniently integrated with the external device, improving the integration of a wearable device, and the metal snap buttons are not easy to slide, reducing noise interference and contact resistance of the sensor during testing.

4. With the screen printing technology, the present disclosure can realize the large-scale production of sensors, which has very high commercial value and industrial prospect.

Figure 1:
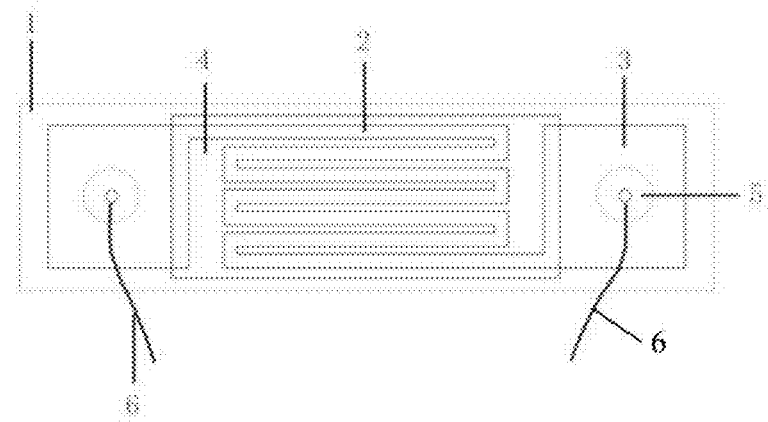
FIG. 1 is a schematic diagram of a structure of a flexible strain sensor in an embodiment of the present disclosure.

In the drawings, 1—flexible substrate, 2—sensing area, 3—connection area, 4—encapsulation layer, 5—metal snap button, and 6—wire.

DETAILED DESCRIPTION OF THE EMBODIMENTS

Hereinafter, the present disclosure will be described in detail with reference to the drawings and specific embodiments, but embodiments of the present disclosure are not limited thereto.

Figure 2:
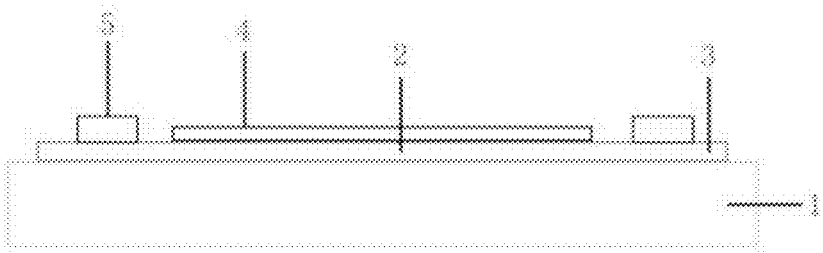
FIG. 2 is a hierarchical cross-sectional view of a flexible strain sensor in an embodiment of the present disclosure.

With reference to FIG. 1 and FIG. 2, a flexible strain sensor in an embodiment is of a layered structure and includes a flexible substrate 1 located on a bottom layer, a sensing area 2 and a connection area 3 located on the flexible substrate 1, an encapsulation layer 4 for protecting the sensing area 2, and accessories for electrical connection; the accessories include metal snap buttons 5 and wires 6. The sensing area and the connection area are intermediate layers, and the encapsulation layer is a top layer.

The sensing area and the connection area are both made of the same conductive material, and the preparation of the sensor based on the same conductive material may be done in one step by means of a screen printing process without the need for a step-by-step process. That is, the sensing area and the connection area are prepared using the same conductive material, and the design rule of the sensor based on the same conductive material may be satisfied by adjusting sizes and shape structures of the sensing area and the connection area.

In one embodiment, the flexible substrate 1 uses high elasticity fabric, i.e., a soft fabric substrate, and the encapsulation layer 4 uses silicone rubber. The sensing area 2 is designed to be connected by a plurality of elongated rectangles circuitously and the connection area 3 is designed as a large rectangle to ensure that strain degrees of the sensing area and the connection area are consistent during deformation and also increase an effective length-width ratio of the sensing area. The sensing area 2 has an effective length of 220 mm and an effective width of 2 mm; the connection area 3 has an effective length of 20 mm and an effective width of 20 mm. The conductive material used in both the sensing area and the connection area is a carbon black-silicone rubber composite conductive material with a volume fraction of 9%, namely, the conductive material is a composite conductive paste mixed by the carbon black and the silicone rubber. Since a length-width ratio of the sensor is not only proportional to an initial value of a resistance but also related to the sensitivity, increasing the length-width ratio may increase the sensitivity of the sensor. It is known that the length-width ratio of the sensing area is greater than that of the connection area, and therefore the initial resistance $R_{s0} \gg R_{c0}$ and sensitivity $GF_s > GF_c$; $R_{s0}$ is an initial resistance value of the sensing area, $R_{c0}$ is an initial resistance value of the connection area, $GF_s$ is the sensitivity of the sensing area, and $GF_c$ is the sensitivity of the connection area.

The performance test for a fully printed flexible strain sensor is as follows.

Figure 3:
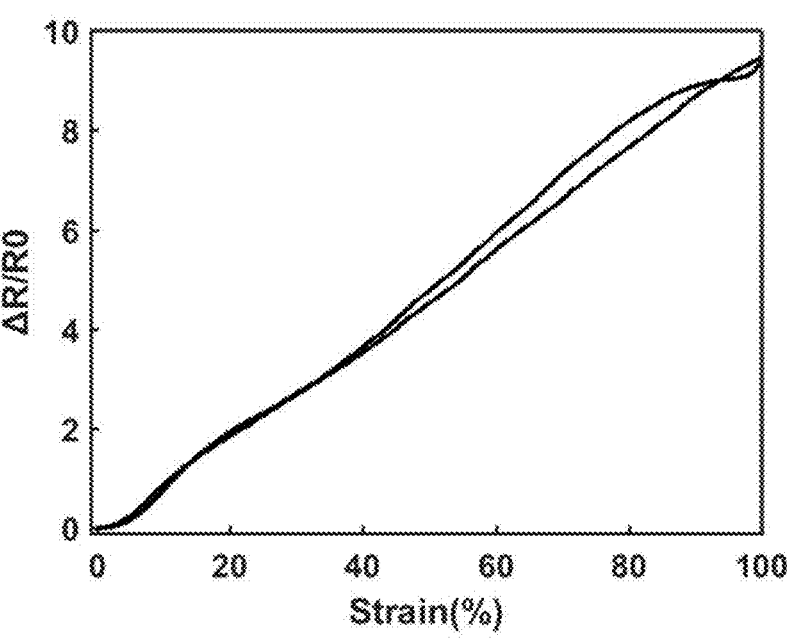
FIG. 3 is a $\Delta R/R \sim$Strain (%) diagram of a flexible strain sensor in an embodiment of the present disclosure.

(1) With reference to FIG. 3, the maximum operating range and the sensitivity of the sensor were tested. An electronic universal testing machine was used, one end of the sensor was fixed, the other end was stretched to 100% at a speed of 1 mm/s, and the tensile force was released until the sensor returned to an original state. The resistance was measured by connecting the metal snap buttons at two ends through the wires to a resistance measuring device (Keithley2700). According to the formula, the sensitivity was calculated as $GF=(\Delta R/R_0)/\varepsilon=9.6$, and the resistance of the sensor returned to the initial value after 100% tensile force was released without hysteresis, indicating that the sensor still maintained the best performance in the strain range of 100%.

Figures 4, 5:
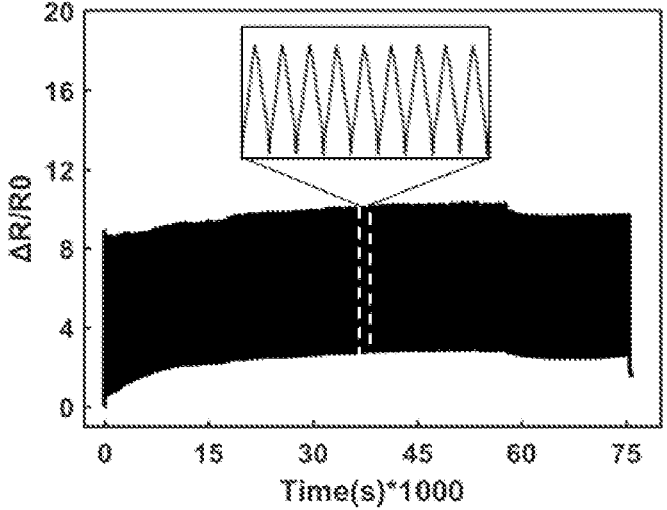
FIG. 4 is a $\Delta R/R \sim$Time(s) diagram of a flexible strain sensor in an embodiment of the present disclosure.
FIG. 5 is a finger bend detection diagram of a flexible strain sensor in an embodiment of the present disclosure.

(2) With reference to FIG. 4, the long-term stability and repeatability of the sensor were tested. An electronic universal testing machine was used, one end of the sensor was fixed, the other end was stretched to 50% for 10,000 times cyclically at a speed of 1 mm/s, and the resistance of the sensor was measured using the Keithley2700. The test results showed that the resistance of the sensor increased gradually during the initial cyclic stretching, but then stabilized. After 10,000 times of stretching, the sensor might still work normally.

(3) With reference to FIG. 5, a common human limb movement signal for finger bend was tested. The fully printed flexible strain sensor was pasted tightly on an index finger joint, one end of each of two wires was connected to each of two metal snap buttons, respectively, and the other ends of the two wires were connected to the resistance measuring device (Keithley2700) for testing. It might be seen from FIG. 5, when the finger was bended, the sensor pasted on the joint was deformed, and a resistance change appeared. When the finger was straightened, the resistance returned to the initial value, and the greater the degree of finger bending, the higher the amplitude of the resistance response. It might be seen that the flexible strain sensor might respond quickly to different degrees of limb movement.

A method for preparing a flexible strain sensor in this embodiment includes the following steps.

At S1, the same composite conductive material is used to design the sensing area and the connection area, where the design rule is that when the sensor is deformed, the resistance value change of the sensor is determined by the sensing area, the resistance value of the connection area may be ignored, and the connection area only serves to connect the sensing area and the external device.

The implementation is as follows.

(1) The main components of the sensor are the sensing area and the connection area, and the resistance change of the sensor may be characterized as:

$$\frac{\Delta R}{R_0} = \frac{\Delta R_s + \Delta R_c}{R_0},$$

where $\Delta R$ is a resistance change value of the sensor, $R_0$ is an initial resistance value of the sensor, $R_s$ represents a resistance value of the sensing area, and $R_c$ represents a resistance value of the connection area.

(2) The resistance change of the sensor may also be expressed as:

$$\frac{\Delta R}{R_0} = GF \cdot \varepsilon,$$

where GF is the sensitivity of the sensor, $\varepsilon$ is a strain value of the sensor, and the formula is transformed to obtain: $\Delta R = GF\varepsilon R_0$.

(3) In conjunction with the equations in (1) and (2), the resistance change of the sensor is characterized as:

$$\frac{\Delta R}{R_0} = \frac{GF_s\varepsilon_s R_{s0} + GF_c\varepsilon_c R_{c0}}{R_0}.$$

In one specific embodiment, $GF_s\varepsilon_s R_{s0} \gg GF_c\varepsilon_c R_{c0}$ is required to satisfy that the resistance change of the sensor under strain depends on the sensing area, among these three variables, $R_0$ is the easiest variable to control, so long as $R_{s0} \gg R_{c0}$, and $GF_s \geq GF_c$, $\varepsilon_s \geq \varepsilon_c$ are guaranteed. $R_{s0}$ represents the initial resistance value of the sensing area, $R_{c0}$ represents the initial resistance value of the connection area, $\varepsilon_s$ is a strain value of the sensing area, and $\varepsilon_c$ is a strain value of the connection area.

The flexible strain sensor of the present disclosure satisfies Ohm's Law, i.e., $$R = \rho \frac{L}{Wt},$$

where $\rho$ represents the resistivity of the composite material, L, W, and t represent the length, the width, and the thickness of the sensor, respectively. It may be seen that the length-width ratio of the sensor is directly proportional to the resistance value, and the same composite conductive material is used for the sensing area and the connection area to ensure $\rho_s = \rho_c$, and the thickness $t_s = t_c$, and therefore $R_{s0} \gg R_{c0}$ is needed, at least $$\frac{R_c}{R_s} \leq 1\%$$

is ensured, namely, $$\frac{L_s}{W_s} \geq 100\frac{L_c}{W_c}.$$

Theoretically, the larger the length-width ratio of the sensing area, the higher the resistance contribution of the sensing area in the sensor, and the more the influence of the resistance of the connection area may be ignored. However, increasing the length-width ratio of the sensing area requires increasing the size of the sensor at the same time, which is not conducive to miniaturization of the sensor. Therefore, the maximum specification of the flexible strain sensor is considered, limiting conditions are given:

$$\frac{L_s}{W_s} \leq 200\frac{L_c}{W_c},$$

where Ws and $W_c$ are the widths of the sensing area and the connection area, respectively, and Ls and Lc are the lengths of the sensing area and the connection area, respectively.

The sensing area is designed to be connected by a plurality of elongated rectangles circuitously, and the connection area is designed as a large rectangle, where a circuitous elongated-rectangle structure is more likely to cause stress concentration when subjected to a force, so as to ensure that the strain degree of the sensing area is greater than that of the connection area when the sensor is deformed, namely $\varepsilon_s > \varepsilon_c$, a condition $\varepsilon_s \geq \varepsilon_c$ is satisfied.

In a preferred embodiment, the sensing area has the effective length of 220 mm and the effective width of 2 mm; the connection area has the effective length of 20 mm and the effective width of 20 mm. The length-width ratio of the sensing area is 110 times that of the connection area, satisfying the design rule.

The conductive material used in the sensing area and the connection area is the carbon black-silicone rubber composite conductive materials with a volume fraction of 9%. Because the length-width ratio of the sensor is not only directly proportional to the initial value of the resistance but also related to the sensitivity, increasing the length-width ratio of the sensor may increase the sensitivity of the sensor. The sizes of the sensing area and connection area have been designed to meet the design requirement $GF_s \geq GF_c$.

In general, the design rules for the sensing area and the connection area satisfy that the resistance change of the sensor under strain depends on the sensing area and neglects the resistance contribution of the connection area, and parameters of the sensor need to meet three conditions: $R_{s0} \gg R_{c0}$, $GF_s \geq GF_c$, and $\varepsilon_s \geq \varepsilon_c$.

At S2, the sensing area and the connection area of the sensor are prepared by printing in one step with the same conductive material through the screen printing process, then a layer of the silicone rubber is coated on the sensing area as the encapsulation layer for protection, and the metal snap buttons are mounted on the connection area through the conductive gel as accessories connected to the external device, so that the whole sensor may be prepared.

In one embodiment, the sensor is prepared by performing one-step printing of the carbon black-silicone rubber composite conductive paste on the fabric substrate on the basis of the screen printing process.

While the above embodiments are preferable embodiments of the present disclosure, the implementation of the present disclosure is not limited by the above embodiments. Any other changes, modifications, substitutions, combinations, and simplifications without departing from the spirit essence and principles of the present disclosure shall be equivalent replacement modes and shall be included in the scope of the present disclosure.

The invention claimed is:

1. A flexible strain sensor based on the same conductive material, wherein the flexible strain sensor is of a layered structure and comprises a flexible substrate, a sensing area and a connection area located on the flexible substrate, and an encapsulation layer for protecting the sensing area;
the sensing area and the connection area are made of the same conductive material, and sizes and shape structures of the sensing area and the connection area satisfy that when the flexible strain sensor is deformed, a resistance value change of the flexible strain sensor is determined by the sensing area, a resistance value of the connection area can be ignored, and the connection area is only used for connecting the sensing area and an external device;
wherein the sensing area has an effective length of 220 mm and an effective width of 2 mm; the connection area has an effective length of 20 mm and an effective width of 20 mm.

2. The flexible strain sensor based on the same conductive material according to claim 1, wherein the sensing area and the connection area are printed in one step by a screen printing process.

3. The flexible strain sensor based on the same conductive material according to claim 1, wherein the sensing area is connected by a plurality of rectangles circuitously, the connection area is a rectangle, and a strain degree of the sensing area is more than a strain degree of the connection area when the sensor is deformed.

4. The flexible strain sensor based on the same conductive material according to claim 1, wherein a conductive material used in the sensing area and the connection area is a composite conductive paste mixed by carbon black and silicone rubber.

5. The flexible strain sensor based on the same conductive material according to claim 4, wherein the composite conductive paste is a carbon black-silicone rubber composite conductive material with a volume fraction of 9%.

6. A preparation method of the flexible strain sensor based on the same conductive material, wherein the flexible strain sensor is of a layered structure and comprises a flexible substrate, a sensing area and a connection area located on the flexible substrate, and an encapsulation layer for protecting the sensing area, the method comprising:
using the same composite conductive material to design the sensing area and the connection area, wherein a design rule is that when the sensor is deformed, the resistance value change of the sensor is determined by the sensing area, the resistance value of the connection area is ignored, and the connection area is only used for connecting the sensing area and the external device;
preparing the sensing area and the connection area of the sensor by printing in one step with the same composite conductive material, coating a silicone rubber on the sensing area as the encapsulation layer for protection, and mounting accessories connected to the external device on the connection area;
wherein in using the same composite conductive material to design the sensing area and the connection area, the resistance change of the sensor is characterized as:

$$\frac{\Delta R}{R_0} = \frac{GF_s \varepsilon_s R_{s0} + GF_c \varepsilon_c R_{c0}}{R_0}$$

wherein $\Delta R$ is the resistance change value of the sensor, $R_0$ is an initial resistance value of the sensor, $R_{s0}$ represents an initial resistance value of the sensing area, $R_{c0}$ represents an initial resistance value of the connection area, $\varepsilon_s$ is a strain value of the sensing area, $\varepsilon_c$ is a strain value of the connection area, $GF_s$ is a sensitivity of the sensing area, and $GF_c$ is a sensitivity of the connection area;
parameters of the sensor are designed to meet three conditions: $R_{s0} >> R_{c0} \geq GF_c$, and $\varepsilon_s \geq \varepsilon_c$.

7. The preparation method according to claim 6, wherein the mounting accessories comprise metal snap buttons.

8. The preparation method according to claim 6, wherein the sizes of the sensing area and the connection area are defined by:

$$100 \frac{L_c}{W_c} \leq \frac{L_s}{W_s} \leq 200 \frac{L_s}{W_c},$$

wherein Ws and Wc are the widths of the sensing area and the connection area, respectively, and Ls and Lc are the lengths of the sensing area and the connection area, respectively.

* * * * *